United States Patent
Neuhaus

(10) Patent No.: US 8,085,759 B2
(45) Date of Patent: Dec. 27, 2011

(54) METHOD FOR ESTABLISHING A VOIP COMMUNICATION USING A PEER-TO-PEER DATABANK

(75) Inventor: Ralf Neuhaus, Lünen (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 1081 days.

(21) Appl. No.: 11/884,984

(22) PCT Filed: Oct. 5, 2005

(86) PCT No.: PCT/EP2005/055011
§ 371 (c)(1),
(2), (4) Date: Aug. 23, 2007

(87) PCT Pub. No.: WO2006/089593
PCT Pub. Date: Aug. 31, 2006

(65) Prior Publication Data
US 2008/0165765 A1    Jul. 10, 2008

(30) Foreign Application Priority Data
Feb. 24, 2005   (DE) .................. 10 2005 008 590

(51) Int. Cl.
*H04L 12/66* (2006.01)
(52) U.S. Cl. ......... 370/352; 370/353; 370/354; 370/355; 370/356; 379/211.01; 379/211.02; 379/211.03; 379/211.04; 709/227; 709/228; 709/229
(58) Field of Classification Search .................. None
See application file for complete search history.

(56) References Cited

U.S. PATENT DOCUMENTS

| | | | |
|---|---|---|---|
| 2002/0116464 A1* | 8/2002 | Mak | 709/206 |
| 2002/0143855 A1 | 10/2002 | Traversat et al. | |
| 2002/0198877 A1* | 12/2002 | Wolff et al. | 707/6 |
| 2003/0108176 A1 | 6/2003 | Kung et al. | |
| 2003/0179743 A1* | 9/2003 | Bosik et al. | 370/352 |
| 2003/0206536 A1 | 11/2003 | Maggenti | |
| 2003/0228011 A1* | 12/2003 | Gibson | 379/211.02 |
| 2004/0248590 A1* | 12/2004 | Chan et al. | 455/456.3 |
| 2004/0260761 A1 | 12/2004 | Leaute et al. | |
| 2005/0097222 A1* | 5/2005 | Jiang et al. | 709/245 |
| 2005/0117733 A1* | 6/2005 | Widger et al. | 379/221.05 |

FOREIGN PATENT DOCUMENTS
DE      103 24 372 A1    1/2005
EP      1 507 395 A1      2/2005

OTHER PUBLICATIONS

"A P2P Approach to SIP Registration" published Jan. 20, 2005 as an internet draft.

(Continued)

*Primary Examiner* — Hassan Phillips
*Assistant Examiner* — Ajay Cattungal

(57) ABSTRACT

In one aspect, a method for operating a communication network comprising a plurality of nodes, whereby a databank is stored in shared manner among the nodes is provided. A first node extracts from the databank identification data for identifying and/or addressing the first node by a correspondent for recording, initiated by the first node, of a communication with the correspondent of an external communication system. In another embodiment, when the recording of a communication with a first node is initiated by a correspondent of an external communication system, a notification concerning the recording of the communication initiated by the correspondent by means of the databank can be supplied to a second node and the correspondent is then tracked. A for implementing the method is also provided.

17 Claims, 5 Drawing Sheets

OTHER PUBLICATIONS

Harry Newton, "Newton's Telecom Dicionary",Entry "Skype", Mar. 2004, p. 754, 20$^{th}$ Revised edition, San Francisco, CA, USA: CMP Books, ISBN 1-57820-309-0.

D. Bryan, C Jennings; "A P2P Approach to SIP Registration", IETF Standard-Working-Draft, Internet Engineering Task Force, CH, Jan. 20, 2005, XP015011205, ISSN: 0000-0004.

* cited by examiner

METHOD FOR ESTABLISHING A VOIP COMMUNICATION USING A PEER-TO-PEER DATABANK

CROSS REFERENCE TO RELATED APPLICATIONS

This application is the US National Stage of International Application No. PCT/EP2005/055011 filed Oct. 5, 2005 and claims the benefit thereof. The International Application claims the benefits of German application No. 102005008590.3 DE filed Feb. 24, 2005, both of the applications are incorporated by reference herein in their entirety.

FIELD OF INVENTION

The invention relates to methods for operating a communication network comprising a plurality of nodes, in which a databank is stored in a shared manner among nodes.

BACKGROUND OF THE INVENTION

In communication systems or networks, messages are transmitted by a sender to one or more receivers. The transmission media and protocols used for transmitting the messages depend on the particular design of the communication system. Examples of communication systems are radio communication systems such as cellular mobile radio communication systems or WLANs (Wireless Local Area Networks), or line-based communication systems such as the public telephone network or LANs (Local Area Networks) or corporate communication networks.

Communications between communication terminals are possible both within a communication network as well as between communication terminals of different communication systems. If a node of a first network initiates the establishment of communication with a node of a second communication network, from the point of view of the first network this constitutes an outgoing communication. If, on the other hand, a node of the second network initiates the establishment of communication with a node of the first network, from the point of view of the first network this constitutes an incoming communication. The establishment of a communication is usually performed by exchanging appropriate signaling messages.

The document US 2002/0143855 A1 describes a peer system in which two groups of peers exist, in which peers in one group cannot communicate directly with peers in the other group. There is a relay node which forwards messages between the two groups.

The document US 2004/0260761 A1 describes a peer-to-peer network for identifying devices. For this purpose, each device enters an identification file in the peer-to-peer network, which file can be searched and filtered by a search engine in order to determine suitable partners.

The document DE 103 24 372 A1 describes the registration of a terminal on a communication node of a communication network. For this purpose the terminal accesses an information store in which the communication nodes are registered.

The document "Newton, Harry: Newton's Telecom Dictionary, 20th updated and expanded edition, San Francisco, Calif., USA: CMP Books, March 2004, page 754, dictionary entry for "Skype", ISBN 1-57820-309-0", describes Skype, software which enables PCs to exchange voice communications over the internet. Skype utilizes VoIP and peer-to-peer technology.

SUMMARY OF INVENTION

The object of the invention is to disclose methods for operating a communication network which are efficient both with respect to outgoing and with respect to incoming communications. In addition, devices for carrying out the methods are to be presented.

This object is achieved by a method and devices having the features of the independent claims. Advantageous embodiments and refinements are set out in the dependent claims.

In the first method according to the invention for operating a communication network comprising a plurality of nodes, a databank is stored in a shared manner among nodes. In order to establish a communication initiated by a first node with a communication partner of an external communication system, said first node queries the databank for identification information for the identification and/or addressing of the first node by the communication partner.

A communication network having a plurality of nodes will be considered. At least some of the nodes of the communication network are preferably communication terminals, such as telephones for example. In this case, in addition to the communication terminals, central devices that do not function as communication terminals may be present. It is however also possible for all nodes of the communication network to be communication terminals.

A distributed databank is used in which several or all nodes of the communication network are involved in the storage of the databank. There is thus no central device that stores the entire databank. It is particularly advantageous if the first node also has part of the databank stored in its store, that is to say if the first node is also involved in the storage of the databank.

A first node of the communication network initiates the establishment of communication with a communication partner on an external communication system. This means that, in the course of establishing communication, the first node first contacts the external communication partner, and not the other way round. In this case, from the point of view of the communication network this constitutes an outgoing communication. The nodes of the communication network can communicate with external communication partners via a gateway node for example, which node forwards messages between the nodes of the communication network and external communication partners.

In order to establish communication with the external communication partner, the first node queries the databank for identification information. In particular this information may be a call number of the communication network, and/or an IP address of the communication network, and/or a name in combination with a password, and/or another subscriber identifier. Said identification information is preferably information which is required to establish communication with the external communication partner, but which is not available to the first node prior to querying the databank.

In a refinement of the invention, the identification information is previously sent to the communication partner by a second node and is input into the databank. It is advantageous if the second node is also involved in the storage of the databank. The second node can send the identification information to the communication partner as part of a registration for example. By means of the registration, the second node is known to the communication partner under the identification information. It is advantageous if, although the second node has performed such a registration with the external communication partner, the first node is nevertheless not known to the external communication partner on the basis of a registration.

In the second method according to the invention for operating a communication network comprising a plurality of nodes, a databank is stored in a shared manner among nodes. In the case of an establishment of communication with a first node initiated by a communication partner of an external communication system, using the databank a second node is notified about the establishment of communication initiated by the communication partner. The establishment of communication is then continued between the second node and the communication partner.

The above explanations with respect to the storage of the databank by the nodes of the communication network, and also with respect to the embodiments of the nodes of the communication network, also apply to the second method according to the invention. The second method according to the invention relates to the establishment of a communication initiated by an external communication partner. This means that, in the course of establishing communication, the external communication partner first contacts the first node, and not the other way round. In this case, from the point of view of the communication network this therefore constitutes an incoming communication.

In the course of the establishment of communication initiated by the external communication partner, a first node is contacted by the communication partner. The second node is notified of information about this establishment of contact, with the databank being involved in the notification of the second node. Thus, for example, the first node can notify the databank about the establishment of communication by the external communication partner, whereupon the databank notifies the second node. Alternatively, the first node can be informed by the databank that the second node is to be notified, and can perform said notification. Following the notification of the second node about the establishment of communication, the establishment of communication between the second node and the communication partner is continued; here the second node preferably takes the place of the first node, which does not continue the establishment of communication.

According to a further development of the invention, prior to the establishment of communication initiated by the communication partner, the first node sends identification information to the communication partner. Furthermore, it is stored in the databank that the second node should be notified in the case of an establishment of communication which is initiated by the communication partner and which uses the identification information for addressing. The identification information is preferably a call number. That the information that the second node is to be notified is stored in the databank preferably results from the fact that the second node has informed the databank of an interest in incoming communications relating to the identification information.

In one embodiment of the invention, the first node notifies the communication partner that the establishment of communication should be continued with the second node. Alternatively, the second node can also notify the communication partner that the establishment of communication should be continued with the second node. Said notifications from the first or the second node to the communication partner preferably include identification information for the second node which is to be used by the communication partner for addressing the second node.

It is particularly advantageous if the nodes of the communication system have equal access to the databank. Access to the databank relates both to the querying of information from the databank and to the storage of information in the databank. The databank is preferably a peer-to-peer databank, and the databank is accessed using a peer-to-peer method. Examples of peer-to-peer methods are: DHT-based methods (DHT: Distributed Hash Table) such as CHORD, Tapestry, Kademlia; methods derived from DHT-based methods; or also other methods such as Gnutella, Opennap, edonkey, Fasttrack.

In one embodiment of the invention, communication is established using SIP (Session Initiation Protocol) both with respect to outgoing and with respect to incoming communications. The communication is preferably a VoIP communication (VoIP: Voice over IP).

A first node according to the invention for a communication network has means for participating in the storage of a databank stored in a shared manner among a plurality of nodes of the communication network, as well as means for initiating an establishment of communication with a communication partner of an external communication system, and means for querying the databank for identification information for the identification and/or addressing of the node by the communication partner and for using the identification information during the establishment of communication.

A second node according to the invention for a communication network has means for participating in the storage of a databank stored in a shared manner among a plurality of nodes of the communication network, as well as means for receiving a notification about an establishment of communication with another node of the communication network initiated by a communication partner of an external communication system from the other node or from the databank, and means for continuing the establishment of communication with the communication partner following the notification.

Both the first and also the second node according to the invention are particularly suitable for carrying out the respective method according to the invention; this may also apply to the embodiments and further developments. They may have further suitable means for this purpose. In particular it is possible for a node to encompass the means of both the first and the second node according to the invention.

BRIEF DESCRIPTION OF THE DRAWINGS

The invention will be explained in greater detail below with reference to an exemplary embodiment.

DETAILED DESCRIPTION OF INVENTION

Figure 1:
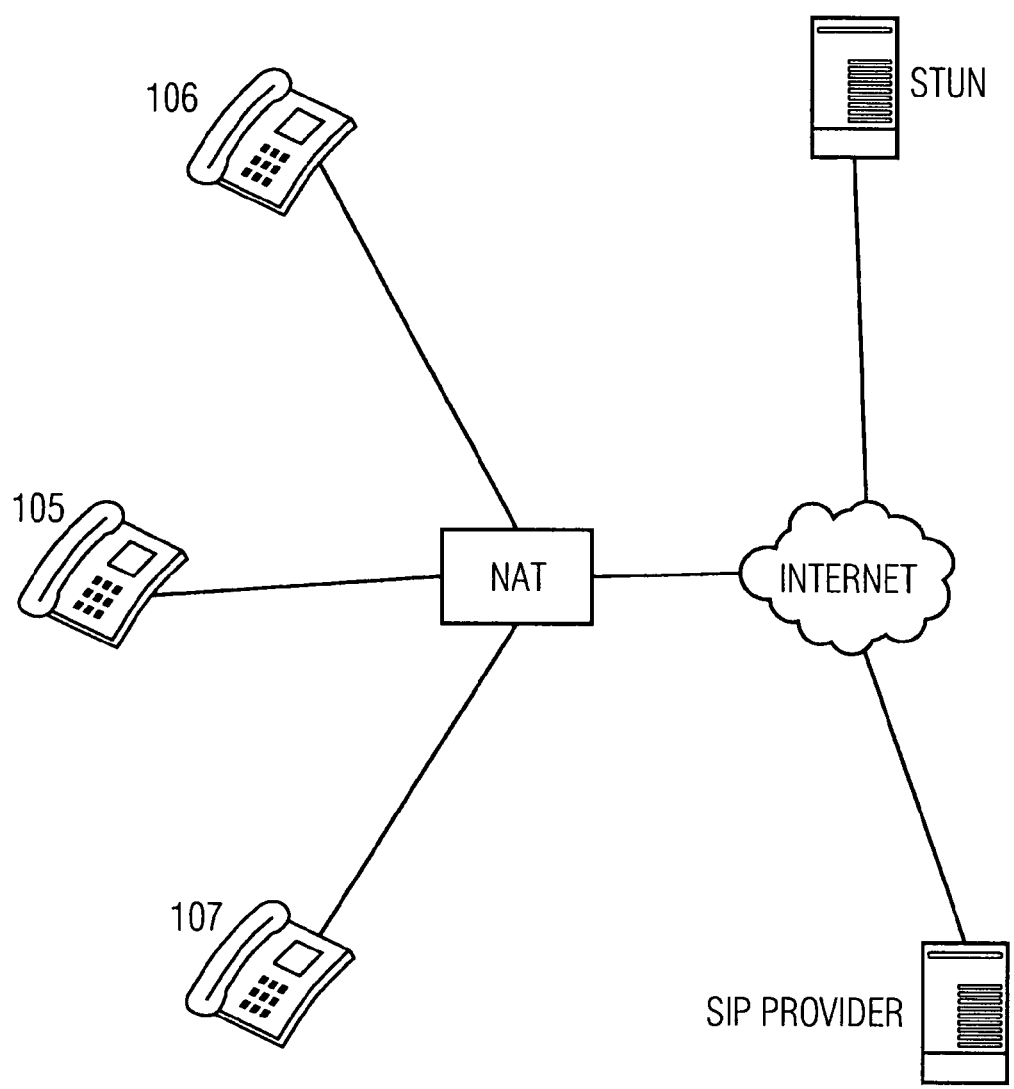
FIG. 1: shows a section of a corporate communication network connected to the internet.

The section of a corporate communication network illustrated in FIG. 1 encompasses the terminals 105, 106 and 107. The figures 105, 106 and 107 are internal call numbers under which the terminals 105, 106 and 107 can be reached within the corporate communication network. The device NAT (NAT: Network Address Translation) to which the terminals 105, 106 and 107 are connected is also part of the corporate communication network. The terminals 105, 106 and 107 can communicate with the internet INTERNET or with servers or communication terminals connected to the internet INTERNET, such as with the servers STUN and SIP PROVIDER for example, via the device NAT. The device NAT may be generally any type of network gateway which enables messages to be transmitted between the internal corporate communication network and an external communication system.

The case where the terminals 105, 106 and 107 are devices that utilize VoIP (Voice over IP) will be considered below. The external communication partners with which the terminals 105, 106 and 107 communicate using VoIP are the server SIP PROVIDER or VoIP-compliant terminals connected to the server SIP PROVIDER. The connection between the internet INTERNET and the terminals 105, 106 and 107 is made via the device NAT. Incoming calls, that is to say calls for which the server SIP PROVIDER contacts the respective terminal, and outgoing calls, that is to say calls for which the respective terminal contacts the server SIP PROVIDER, are possible.

Figure 2:
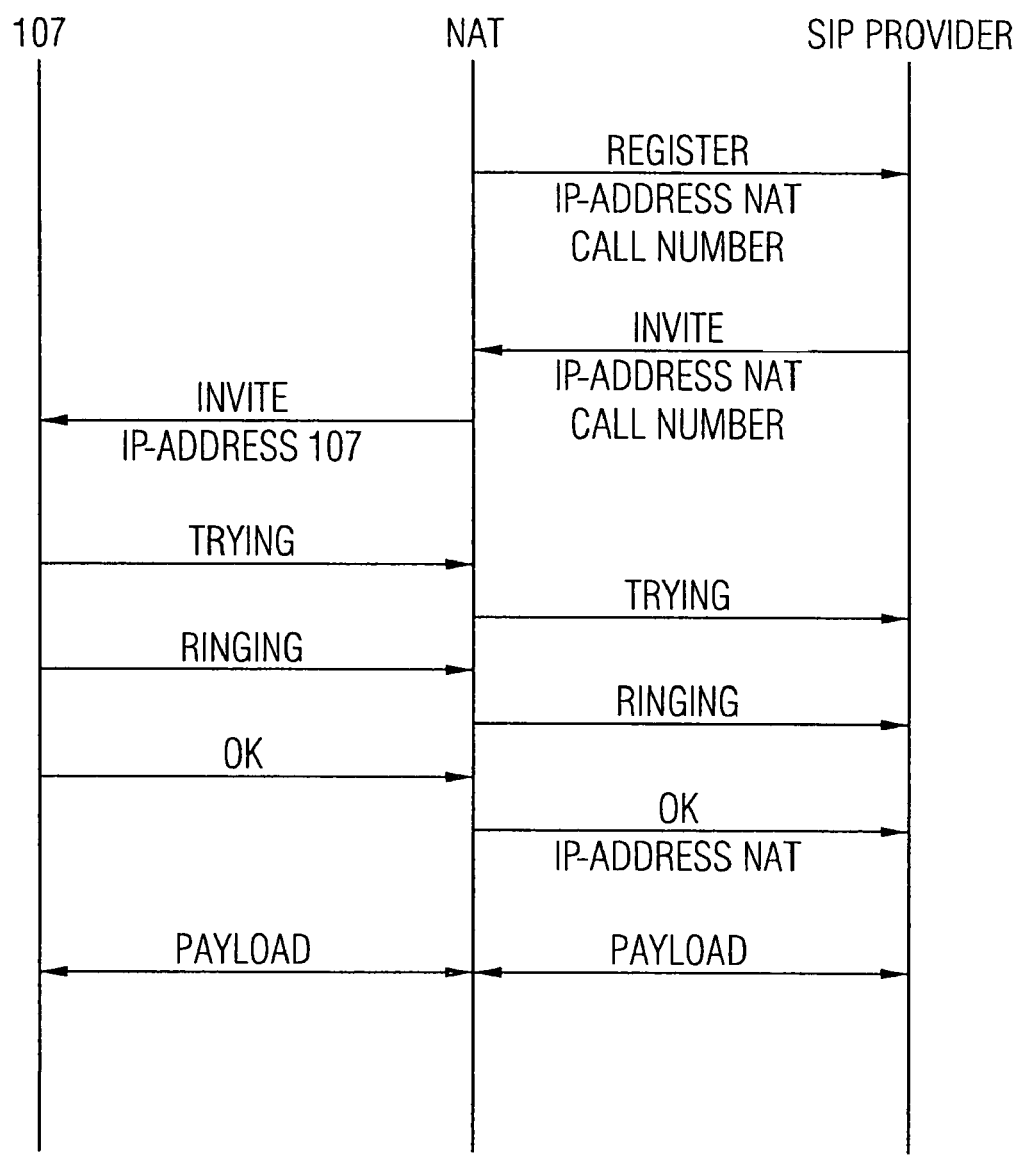
FIG. 2: shows the sequence of a message exchange for an incoming call according to the prior art.

FIG. 2 shows the sequence of the message exchange during the establishment of an incoming call according to the prior art. The messages symbolized by arrows correspond to the standardized messages according to SIP (Session Initiation Protocol). Using the message REGISTER, the device NAT registers with the server SIP PROVIDER specifying its IP address IP-ADDRESS NAT and a call number CALL NUMBER.

Following said registration, the device NAT is known to the server SIP PROVIDER under the IP address IP-ADDRESS NAT and the call number CALL NUMBER, so that the server SIP PROVIDER is both able to place calls to the call number CALL NUMBER and to accept calls from the call number CALL NUMBER.

FIG. 2 shows the case where the server SIP PROVIDER or a terminal connected to the server SIP PROVIDER would like to set up a VoIP connection to the terminal of the corporate communication network having the call number CALL NUMBER. The server SIP PROVIDER thus sends the message INVITE, which is addressed to the IP address IP-ADDRESS NAT of the device NAT, to the device NAT, with specification of the call number CALL NUMBER. The device NAT has a store in which a link between the terminals 105, 106 and 107 and various call numbers is stored. In the example shown in FIG. 2, the external call number CALL NUMBER is associated with the terminal 107. In addition, an internal IP address which is known and used only within the corporate communication network is allocated to the terminals 105, 106 and 107 in each case.

The device NAT links the call number CALL NUMBER to the terminal 107 and therefore sends a message INVITE to the terminal 107 using the internal IP address IP-ADDRESS 107 of the terminal 107. The terminal 107 intends to accept the incoming call and therefore sends the messages TRYING, RINGING and OK to the device NAT, which forwards them to the server SIP PROVIDER. The IP address IP-ADDRESS NAT of the device NAT which is known to the server SIP PROVIDER is used for the forwarding, and not the internal IP address IP-ADDRESS 107 of the terminal 107, as the latter is not known to the server SIP PROVIDER. The device NAT thus does not forward the messages transparently, but performs an address translation. Following reception of the messages TRYING, RINGING and OK by the server SIP PROVIDER, VoIP data PAYLOAD can be transmitted between the server SIP PROVIDER and the terminal 107, with the device NAT handling the forwarding and address translation of the VoIP data PAYLOAD.

As explained, according to the prior art a central device is installed at the gateway from the corporate communication network to the internet INTERNET, which is designated the device NAT in FIG. 1, often also referred to as border proxy, IP-IP gateway or back-to-back user agent. All the signaling and payload data terminates at said central device from both sides, that is to say from the point of view of the terminals 105, 106 and 107 and from the point of view of the internet INTERNET. Seen from the outside, that is to say from the internet INTERNET, only the central device with its IP address IP-ADDRESS NAT is known. The central device performs an address conversion between an external call number and an internal IP address of a terminal 105, 106 or 107 in each case. This address conversion is necessary because only a limited number of external IP addresses is available to the corporate communication network, so not every terminal 105, 106 or 107 can be known and addressed externally by its own IP address.

The invention makes it possible to dispense with the device NAT with respect to the tasks of registration and address conversion described with reference to FIG. 2. As will be described in greater detail below, the device NAT is only used for transparently forwarding messages between the server SIP PROVIDER and the terminals 105, 106 and 107. A virtual databank in the form of a peer-to-peer databank is used, which databank is stored by the terminals 105, 106 and 107 or, respectively, in a shared manner among the terminals 105, 106 and 107. The terminals 105, 106 and 107 thus form a peer-to-peer network.

Peer-to-peer methods provide instructions for storing data in stores and locating data in the respective store(s) in question. Each peer or a plurality of peers makes available a portion of its own store for storing the peer-to-peer databank. The data/information of the peer-to-peer databank is typically located at a plurality of locations in the peer-to-peer network, so that a high level of fail-safety is achieved by the virtual databank formed by the peers. A peer-to-peer method thus enables a peer, that is to say a node-communicating with other nodes using the peer-to-peer method, to locate other peers, with a specific namespace for the respective peer-to-peer method being used to address the peers. It also enables a peer to locate data stored by other peers in an efficient way.

The following may be used as the peer-to-peer method for example:
  CHORD, described e.g. in http://www.cs.biu.ac.il/~galk/teaching/p2p/stoica01chord.pdf
  Tapestry, described e.g. at http://www.cs.ucsb.edu/~ravenben/tapestry/
  Kademlia, described e.g. in http://www.cs.rice.edu/Conferences/IPTPS02/109.pdf
  Gnutella, described e.g. in http://www.stanford.edu/class/cs244b/gnutella_protocol_0.4.pdf
  Fasttrack (KaZaA, also Skype derived from this) described e.g. at http://www.kazaa.com; http://www.skype.com.

All terminals 105, 106 and 107 of the corporate communication network are preferably involved in the storage of the peer-to-peer databank. Alternatively, it is also possible for only some of the terminals to store data of the peer-to-peer databank, and/or for the device NAT to also be involved in the storage of the peer-to-peer databank. Irrespective of whether they are involved in the storage of the peer-to-peer databank, the terminals can both access the peer-to-peer databank, that is to say input or modify information in the peer-to-peer databank, and read out or query information from the peer-to-peer databank.

The peer-to-peer databank is stored in a redundant manner, that is to say in the event of a temporary or complete failure of a peer-to-peer servant, i.e. a peer involved in the storage, the information stored by said peer is not lost because it is also stored by one or more other peer-to-peer servants. The peer-to-peer method thus makes reliable and fast location of all information in the peer-to-peer databank possible at all times.

A terminal performs a registration with the server SIP PROVIDER for each external call number of the corporate communication network to be used for communicating with the server SIP PROVIDER, that is to say for each call number at which the terminals of the corporate communication network are to be addressable by external communication partners connected to the server SIP PROVIDER. The message REGISTER described in FIG. 2 may be used for this purpose. Since as a rule fewer external call numbers are available than terminals, not every terminal performs a registration. The external call numbers in combination with in each case an external IP address of the corporate communication network are thus known to the server SIP PROVIDER.

The following procedure is possible with respect to the external IP addresses which are used by the terminals and are notified to the server SIP PROVIDER with the registration messages: an external IP address of the corporate communication network is used. Each of the terminals uses said external IP address in combination with a particular port number. By using different port numbers for the different terminals, the device NAT knows to which terminal an IP message addressed to the external IP address in combination with a port number is to be forwarded. In this way, every terminal can be addressed by an external communication partner using the external IP address in combination with the terminal-specific port number without requiring address conversion by the device NAT.

Each terminal determines the combination of external IP address of the corporate communication network and port number it is to use. This may be accomplished for example by sending a query to the server STUN using the known STUN (Simple Traversal of User Datagram Protocol through NAT) mechanism. The combination of external IP address and port number thus determined is input by each terminal into the peer-to-peer databank, so that it is possible to obtain for each terminal from the peer-to-peer databank the information specifying how it is to be addressed externally for IP data. The IP addresses used by a terminal may differ for different applications, e.g. for SIP signaling and RTP payload (RTP: Real Time Protocol). This means that several combinations of external IP address of the corporate communication network and port number may be stored in the peer-to-peer databank for each terminal.

Each terminal that has registered with the server SIP PROVIDER inputs all information required for placing an outgoing call from the respective external call number for which the registration was performed into the peer-to-peer databank. This relates to the following values:

- external call number of the corporate communication network;
- external IP address of the corporate communication network in combination with the port number of the respective terminal that was used for registration in connection with the external call number;
- name or customer identifier and password for logging onto the server SIP PROVIDER;
- SIP address comprising a subscriber identifier assigned by the server SIP PROVIDER or call number and the SIP domain of the server SIP PROVIDER.

The peer-to-peer databank thus contains all information that any terminal requires to place an outgoing call from a call number of the corporate communication network to the server SIP PROVIDER. If a terminal intends to set up an outgoing connection, the terminal inputs the call number of the desired external communication partner into the peer-to-peer databank or, respectively, queries the values required for setting up a connection to said external communication partner, with specification of the call number of the desired external communication partner. In response, the terminal receives the above-mentioned values, i.e. an external call number of the corporate communication network, the external IP address of the corporate communication network in combination with a port number that was used for registration in connection with the external call number, name and password, and the SIP address. Said values are then used by the terminal to set up a communications connection to the server SIP PROVIDER. The device NAT performs here solely a forwarding of the messages between the respective terminal and the internet INTERNET.

Figure 3:
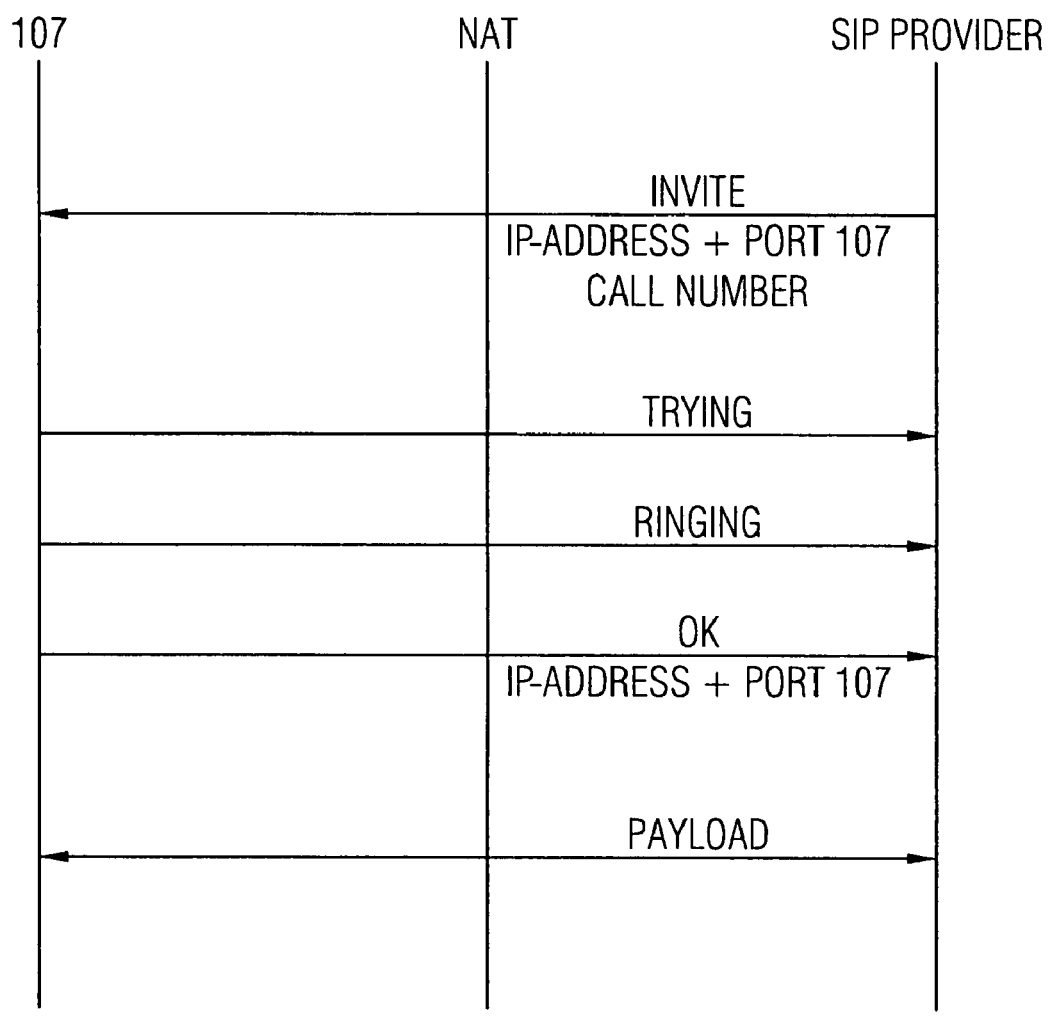
FIG. 3: shows a first sequence according to the invention of a message exchange for an incoming call.

FIG. 3 shows a first sequence of the method according to the invention in relation to incoming calls. It is assumed that the terminal 107 has registered under the external IP address IP-ADDRESS of the corporate communication network in combination with its port number PORT 107 with the server SIP PROVIDER under the call number CALL NUMBER. To set up a connection to the call number CALL NUMBER, the server SIP PROVIDER sends the message INVITE to the device NAT, with specification of the external IP address IP-ADDRESS of the corporate communication network in combination with the port number PORT 107 of the terminal 107 and the call number CALL NUMBER. Since the port number used by the terminal 107 is known to the device NAT, said device NAT forwards the message INVITE to the terminal 107.

The terminal 107 intends to accept the call and responds with the messages TRYING, RINGING and OK, using for this purpose the external IP address IP-ADDRESS of the corporate communication network in combination with the port number PORT 107 of the terminal 107. The device NAT forwards the messages TRYING, RINGING and OK to the server SIP PROVIDER without processing. Following reception of the messages TRYING, RINGING and OK by the server SIP PROVIDER, VoIP data PAYLOAD is exchanged between the server SIP PROVIDER and the terminal 107, with the VoIP data PAYLOAD being forwarded transparently by the device NAT.

Figure 4:
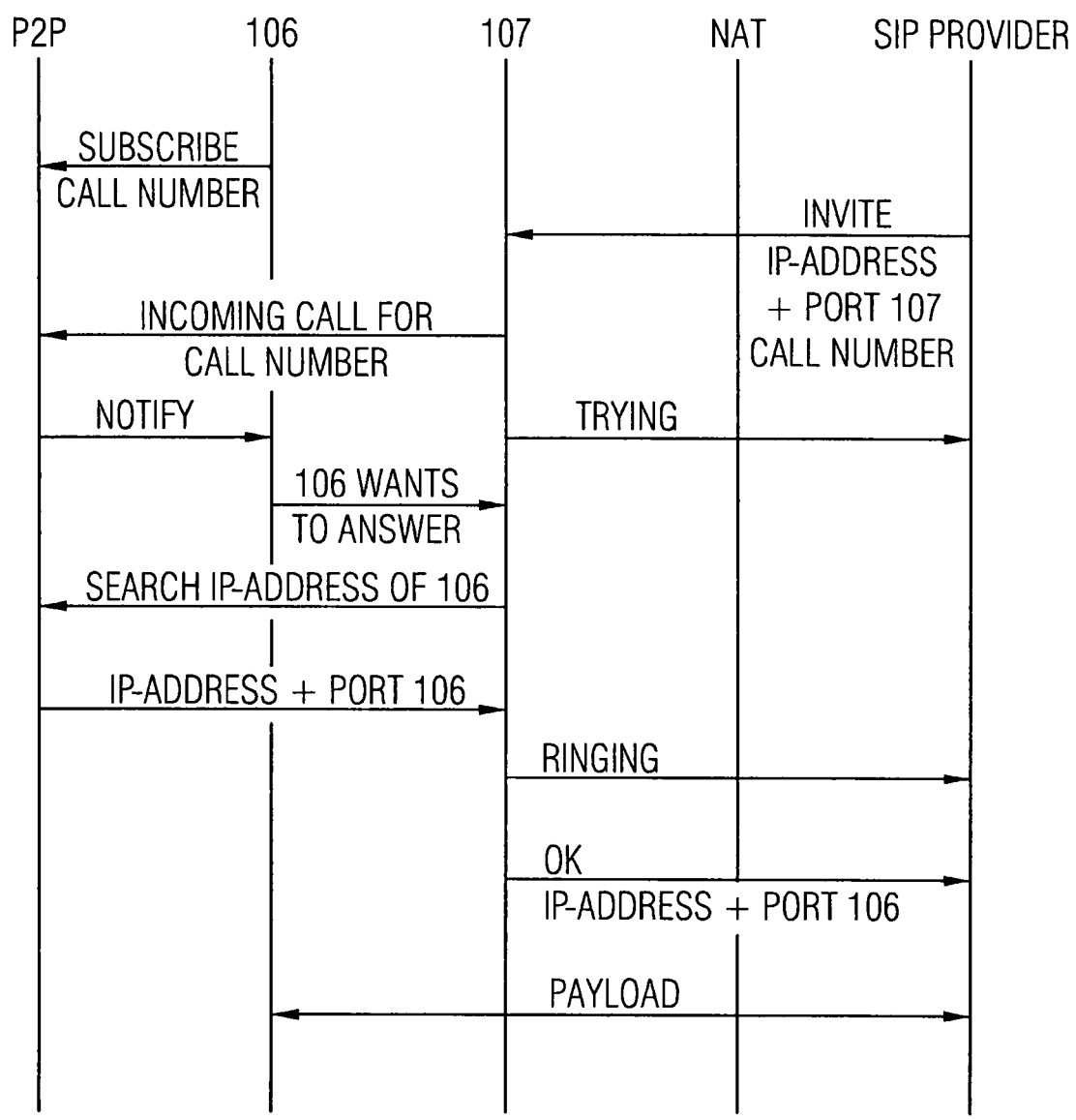
FIG. 4: shows a second sequence according to the invention of a message exchange for an incoming call.
Figure 5:
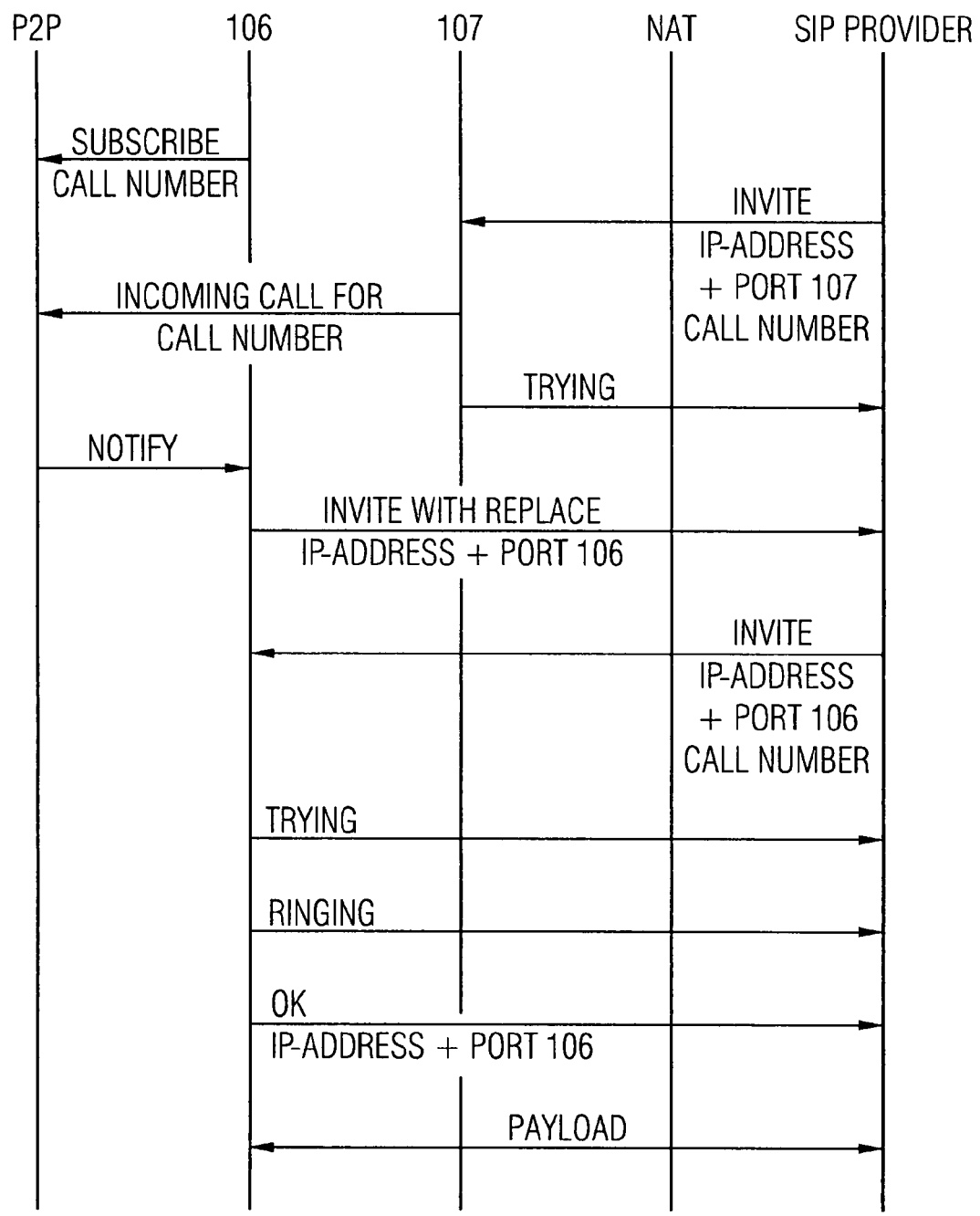
FIG. 5: shows a third sequence according to the invention of a message exchange for an incoming call.

According to the situation set out with reference to FIG. 3, the terminal 107 which previously registered with the server SIP PROVIDER for the call number CALL NUMBER accepts the call for the call number CALL NUMBER. By using the peer-to-peer databank it is alternatively possible for a terminal other than the one that performed the registration to accept the call for the call number CALL NUMBER, as illustrated in FIGS. 4 and 5. It is assumed in both cases that the terminal 107 has registered with the server SIP PROVIDER under the call number CALL NUMBER.

The terminal 106 is interested in incoming calls for the call number CALL NUMBER although it has not registered with the server SIP PROVIDER under the call number CALL NUMBER and, according to the first step in FIG. 4, informs the peer-to-peer databank P2P of this with the message SUBSCRIBE CALL NUMBER. This information about the subscription of the terminal 106 for incoming calls to the call number CALL NUMBER is stored in the peer-to-peer databank P2P so that the terminal 106 can be informed in the event of an incoming call for the call number CALL NUMBER. To establish communication with the terminal having the call number CALL NUMBER, the server SIP PROVIDER sends the message INVITE to the external IP address IP-ADDRESS of the corporate communication network and the port number PORT 107 of the terminal 107. The terminal receives the message INVITE of the server SIP PROVIDER by means of forwarding by the device NAT and informs the peer-to-peer databank P2P with the message INCOMING CALL FOR CALL NUMBER that a call is arriving for the call number CALL NUMBER. The terminal 107 also answers the server SIP PROVIDER with the message TRYING, which is forwarded by the device NAT.

The terminal 106 receives the message NOTIFY which is automatically generated by the peer-to-peer databank P2P to notify that a call for the call number CALL NUMBER is arriving. The message NOTIFY also indicates to the terminal 106 that the terminal 107 is registered with respect to calls for the call number CALL NUMBER, so that the terminal 106 can inform the terminal 107 with the message 106 WANTS TO ANSWER that it wishes to accept the incoming call for the call number CALL NUMBER. Alternatively, the terminal 106 can also inform the peer-to-peer databank P2P that it wishes to accept the incoming call for the call number CALL NUMBER, whereupon the peer-to-peer databank P2P notifies the terminal 107 of this.

Once the terminal 107 knows that the terminal 106 intends to accept the call, it queries the peer-to-peer databank P2P with the message SEARCH IP-ADDRESS of 106 for the IP address used by the terminal 106 and receives as the query result the external IP address IP-ADDRESS of the corporate communication network and the port number PORT 106 of the terminal 106. The terminal 107 sends the messages RINGING and OK to the server SIP PROVIDER, with the latter indicating the IP address IP-ADDRESS used by the terminal 106 and the port number PORT 106 of the terminal 106. Following reception of the message OK by the server SIP PROVIDER, VoIP data PAYLOAD is exchanged between the server SIP PROVIDER and the terminal 106, with the server SIP PROVIDER addressing the terminal 106 using the IP address IP-ADDRESS and the port number PORT 106 of the terminal 106.

As an alternative to the procedure according to FIG. 4, the described method following reception of the message NOTIFY by the terminal 106 may also proceed as illustrated in FIG. 5. If it wishes to accept the incoming call for the call number CALL NUMBER, the terminal 106 sends the message INVITE WITH REPLACE to the server SIP PROVIDER, specifying the external IP address IP-ADDRESS and its port number PORT 106. The terminal 106 obtains the IP address of the server SIP PROVIDER required for this purpose from the message NOTIFY. The message INVITE WITH REPLACE indicates to the server SIP PROVIDER that the external IP address IP-ADDRESS and the port number PORT 106 is to be used for the following message transmissions and not the external IP address IP-ADDRESS and the port number PORT 107. The server SIP PROVIDER then sends the message INVITE to the external IP address IP-ADDRESS and the port number PORT 106. The terminal 106 responds with the messages TRYING, RINGING and OK, with the latter specifying the external IP address IP-ADDRESS and the port number PORT 106 of the terminal 106. Following this, VoIP data is exchanged between the server SIP PROVIDER and the terminal 106, with the server SIP PROVIDER addressing the terminal 106 using the IP address IP-ADDRESS and the port number PORT 106 of the terminal 106.

Alternatively to the message NOTIFY being sent by the peer-to-peer databank P2P, the message NOTIFY can also be sent by the terminal 107 to the terminal(s) subscribed for the call number CALL NUMBER. To address the subscribed terminals, the terminal 107 queries the peer-to-peer databank P2P for the IP addresses used by said terminals.

According to the procedure described, it is possible for terminals that have not registered for the call number CALL NUMBER to accept incoming calls for the call number CALL NUMBER. For this purpose the peer-to-peer databank P2P stores which terminal(s) are potentially interested in incoming calls for the call number CALL NUMBER, that is to say which terminals are subscribed for the call number CALL NUMBER. If several terminals have signaled an interest in calls for the call number CALL NUMBER to the peer-to-peer databank P2P using a message SUBSCRIBE CALL NUMBER, in the event of an incoming call for the call number CALL NUMBER, the peer-to-peer databank P2P sends a message NOTIFY to each of said terminals. The terminal that responds first to the message NOTIFY can accept the call. If the terminal that registered with the server SIP PROVIDER under the call number CALL NUMBER intends to accept the incoming call for the call number CALL NUMBER, said terminal does not send a message INCOMING CALL FOR CALL NUMBER to the databank P2P.

The invention confers the advantage that no central device is required to connect the terminals of the corporate communication network to the external server SIP PROVIDER by means of registration with the server SIP PROVIDER and processing of the messages from both sides. Rather, according to the invention the device NAT serves only for the transparent forwarding of messages between the terminals and the server SIP PROVIDER. As a result, the requirements with respect to the capabilities of the device at the boundary between the corporate communication network and the internet INTERNET are reduced. This reduction is especially advantageous in distributed networks in which all nodes are of the same type, and consequently all nodes must be able to function as the node at the boundary. In this case, although at any one time only one of the nodes would assume the function of the device at the gateway from the corporate communication network to the external system, the other nodes must nevertheless be equipped to perform this function.

Moreover, the use of the invention increases the fail-safety of the corporate communication network with respect to communication with external communication partners. This is because the availability of the distributed peer-to-peer databank is greater than that of a central databank, since the entire network is affected if a central databank fails, whereas by virtue of the redundant peer-to-peer storage method, the use of the distributed databank is not restricted if a device which stores only part of the distributed databank fails.

Since the device NAT does not perform any functions, both with respect to signaling and to payload data, during the set-up of communication connections between terminals of the corporate communication network and an external system other than the transparent forwarding of messages, the device NAT can be dispensed with. This applies both to incoming and to outgoing calls. The transparent forwarding of messages function can be assumed by one of the terminals.

Although the invention was described with reference to the SIP protocol, it is not limited to the use of SIP. Other protocols may also be used within the scope of the invention, such as H.323 for example.

The invention claimed is:

1. A method for operating a communication network, the communication network having a plurality of communication terminals connected to a databank having information of the terminals needed for the terminals to place outgoing calls to a server, the communication terminals comprising a first communication terminal and a second communication terminal, the method comprising:

the first communication terminal registering with the server;
the second communication terminal sending a first message to the databank to subscribe to receive notification of incoming calls to the first communication terminal, the second communication terminal not registered with the server;
in response to the first message, the databank storing data for use in informing the second communication terminal when an incoming call for the first communication terminal is received;
the first communication terminal receiving a second message from the server, the second message being sent to establish a call with the first communication terminal;
informing the databank that an incoming call is arriving for the first communication terminal;
the second communication terminal receiving a third message from the databank or the first communication terminal informing the second communication terminal that the incoming call is arriving at the first communication terminal;
the second communication terminal sending a fourth message to one of the first communication terminal and the databank requesting to answer the incoming call for the first communication terminal;
the first terminal querying the databank for address information of the second communication terminal used by the second communication terminal to receive calls external to the communication network; and
the first terminal sending a fifth message to the server indicating the address information of the second communication terminal such that the incoming call is routed by the server to the second communication terminal.

2. The method as claimed in claim 1, wherein the incoming call is a VoIP communication.

3. The method as claimed in claim 1, wherein the communication terminals have equal access to the databank, and wherein the databank is a peer-to-peer databank, and wherein the databank is accessed using a peer-to-peer method.

4. The method as claimed in claim 1, wherein the address information comprises an external address and port number for the second communication terminal.

5. The method as claimed in claim 4, wherein the address information comprises a call number.

6. A method for operating a communication network, the communication network having a plurality of communication terminals connected to a databank having information of the terminals needed for the terminals to place outgoing calls to a server, the communication terminals comprising a first communication terminal and a second communication terminal, the method comprising:
the first communication terminal registering with the server;
the second communication terminal sending a first message to the databank to subscribe to receive notification of incoming calls to the first communication terminal, the second communication terminal not registered with the server;
in response to the first message, the databank storing data for use in informing the second communication terminal when an incoming call for the first communication terminal is received;
the first communication terminal receiving a second message from the server, the second message being sent to establish a call with the first communication terminal;
informing the databank that an incoming call is arriving for the first communication terminal;
the second communication terminal receiving a third message from one of the databank and the first communication terminal informing the second communication terminal that the incoming call is arriving at the first communication terminal;
the second communication terminal sending a fourth message to the server requesting to answer the incoming call for the first communication terminal, the fourth message having address information of the second communication terminal used by the second communication terminal to receive calls; and
the server routing the incoming call to the second communication terminal using the address information of the second communication terminal.

7. The method as claimed in claim 6, wherein the incoming call is a VoIP communication.

8. The method as claimed in claim 6, further comprising: a gateway receiving the fourth message from the second communication terminal and forwarding the fourth message to the server.

9. The method as claimed in claim 6, wherein the first communication terminal informs the databank of the incoming call and wherein the databank sends the third message to the second communication terminal.

10. The method as claimed in claim 9, wherein the address information comprises a call number.

11. The method as claimed in claim 6 wherein the first communication terminal sends the third message to the second communication terminal.

12. The method as claimed in claim 6, wherein the communication terminals have equal access to the databank.

13. The method as claimed in claim 12, wherein the databank is a peer-to-peer databank, and wherein the databank is accessed using a peer-to-peer method.

14. The method as claimed in claim 13, wherein the incoming call is established using Session Initiation Protocol.

15. A communication system comprising:
a plurality of communication terminals comprising a first communication terminal and a second communication terminal;
a databank connected to the communication terminals, the databank having address information of the terminals;
the second communication terminal sending a first message to the databank to subscribe to receive notification of incoming calls to the first communication terminal,
in response to the first message, the databank storing data for use in informing the second communication terminal when an incoming call for the first communication terminal is received;
the first communication terminal receiving a second message from a server, the second message being sent to establish a call with the first communication terminal;
the second communication terminal receiving a third message from the databank or the first communication terminal informing the second communication terminal that the incoming call is arriving at the first communication terminal;
one of:
the second communication terminal sending a fourth message to one of the first communication terminal and the databank requesting to answer the incoming call for the first communication terminal, and
the second communication terminal sending the fourth message to the server requesting to answer the incoming call for the first communication terminal, the fourth message having address information of the second communication terminal used by the second communication terminal to receive calls;

if the second communication terminal sends the fourth message to one of the first communication terminal and the databank, the first terminal querying the databank for address information of the second communication terminal used by the second communication terminal to receive calls external to the communication network and sending a fifth message to the server indicating the address information of the second communication terminal such that the incoming call is routed by the server to the second communication terminal; and if the second communication terminal sends the fourth message to the server, the second communication terminal receiving the incoming call via the server based on the address information of the second communication terminal provided to the server via the fourth message.

16. The system of claim 15 wherein the communication terminals are comprised of telephones.

17. The system of claim 15 wherein the address information of the second communication terminal comprises at least one of a call number, an address of the second communication terminal, and a port number.

* * * * *